United States Patent [19]

Wideman

[11] Patent Number: 4,696,779
[45] Date of Patent: Sep. 29, 1987

[54] METHOD AND APPARATUS FOR FORMING AN ISOTROPIC SELF-ADHERING ELASTOMERIC RIBBON

[75] Inventor: Ronald H. Wideman, Winnebago County, Wis.

[73] Assignee: Kimberly-Clark Corporation, Neenah, Wis.

[21] Appl. No.: 840,263

[22] Filed: Mar. 17, 1986

[51] Int. Cl.⁴ .................................... B29C 47/34
[52] U.S. Cl. .................... 264/211.13; 264/211.18; 264/213; 264/237; 264/348; 425/71; 425/325; 425/377; 425/378 R
[58] Field of Search .............. 264/237, 348, 300, 213, 264/211, 175, 178 R, 178 F, 176 R, 180, 177.17, 177.19, 211.13, 211.18; 425/71, 377, 325, 378 R, 371, 224, 324.1

[56] References Cited

U.S. PATENT DOCUMENTS

| 2,075,735 | 3/1937 | Loomis | 264/175 |
|---|---|---|---|
| 2,590,186 | 3/1952 | Land | 18/57 |
| 2,945,261 | 7/1960 | Aykanian et al. | 425/377 |
| 3,175,026 | 3/1958 | James | 264/210 |
| 3,594,461 | 7/1971 | Jacob | 264/237 |
| 3,734,415 | 5/1976 | Franz et al. | 425/325 |
| 3,819,793 | 6/1974 | Elliott | 264/213 |
| 3,837,781 | 9/1974 | Lambertus | 425/377 |
| 3,852,387 | 12/1974 | Bortnick et al. | 264/40 |
| 3,872,197 | 3/1975 | Kato et al. | 264/40 |
| 3,878,283 | 4/1975 | Jones, Sr. | 264/156 |
| 3,890,074 | 6/1975 | Fritsch | 425/377 |
| 3,984,509 | 10/1976 | Hall et al. | 264/211 |
| 3,988,098 | 10/1976 | Kato et al. | 425/224 |
| 4,004,870 | 1/1977 | Guttinger et al. | 425/371 |
| 4,017,248 | 4/1977 | Dieffenbacher et al. | 425/371 |
| 4,178,337 | 12/1979 | Hall et al. | 264/176 R |
| 4,254,074 | 3/1981 | Toyooka et al. | 264/132 |

Primary Examiner—Jeffery Thurlow
Attorney, Agent, or Firm—Douglas L. Miller; Donald L. Traut; Jeremiah J. Duggan

[57] ABSTRACT

Apparatus and method for extruding and cooling self-adhering elastomeric materials to obtain substantial uniform consistency. This is accomplished by bisurfacially exposing the material to cooling while supporting the material as a foraminous means.

12 Claims, 3 Drawing Figures

METHOD AND APPARATUS FOR FORMING AN ISOTROPIC SELF-ADHERING ELASTOMERIC RIBBON

BACKGROUND OF THE INVENTION

1. Field of the Invention

This invention relates generally to apparatus and method for forming extruded ribbons of self-adhering elastomeric material.

2. Description of the Related Art

Extruded ribbons of self-adhering elastomeric materials recently have come into commercial usage, in applications where the self-adhesive character of such materials is advantageously employed, e.g., in products such as disposable diapers, and in shoe covers where the ribbons are used, wherein these ribbons are utilized as elastic gathers around leg openings, as foot opening gathering means and anti-skid strips on the soles thereof.

The elastomeric materials from which such ribbons are extruded may be self-adherent per se or may be rendered self-adherent by, for example, the addition of tackifiers to the elastomeric material prior to hot-melt formation and extrusion thereof in ribbon form. Illustrative self-adhering elastomeric materials include those described in U.S. Pat. No. 4,418,123 to Bunnelle, et al., incorporated herein by reference. Commercially available materials of such type include FULLASTIC® adhesive elastic as available from H. B. Fuller Company.

A problem which has arisen in the production of extruded ribbons of such self-adherent elastomeric materials has been the nonuniformity of physical properties arising from the method of cooling the extrudate ribbons. Such cooling typically has been carried out by passing the hot-melt extrudate of the elastomeric material onto the outer cylindrical surface of a rotating chill roll. The chill roll may be internally cooled or alternatively may be mounted in partially submerged position in a water bath, to effect dissipation of heat from the ribbon on the chill roll outer cylindrical surface. The cooling of the extrudate ribbon by means of such chill roll systems yields nonuniform properties, e.g., tack and dynamic adhesion, across the thickness of the ribbon, due to the preferential cooling of one side thereof. The prior art has proposed various approaches to cooling of extrudate and hot-melt materials, but the same are characterizable by deficiencies in application to self-adhering elastomeric ribbon materials.

U.S. Pat. No. 3,175,026 to A. L. James discloses a system for extrusion of thermoplastic film materials such as polyethylene, in substantially fluid condition onto a cooled arcuate surface and then into a nip formed with an adjacent arcuate surface to form sheets of uniform gauge. The sheet thus is cooled to solidified condition while advancing in surface contact over the arcuate surfaces, both of which are smooth and glossy, one being relatively deformable. The arcuate surfaces, both of which may be cooled, advance at a faster rate of speed than the rate of extrusion to pull the sheet of fluid thermoplastic material from the extrusion source.

A specifically disclosed embodiment in the patent comprises a cooled metallic cylinder cooperating with a draw roll and rotated therewith or independently driven at the same peripheral speed in opposite directions. The film of thermoplastic material solidified on the cooling cylinder is withdrawn therefrom by means of guide rolls to a final winding station where the film material is wound into a roll. The patent also discloses an embodiment which utilizes in place of the draw roll an endless backup belt mounted on a series of drive rollers and positioned in contact with the cooling cylinder to support the thermoplastic film about a portion of the periphery thereof (column 5, lines 35-37). The patent discloses the use of a hollow internally cooled drum to constantly cool the surface of the belt to prevent overheating thereof.

The method and apparatus of the James patent utilizes arcuate conveying surfaces of different materials and different sizes (the draw roll or endless belt providing a smaller extent of thermoplastic film-contacting surfaces than the cooling cylinder) so that primary cooling and solidification is effected on the cooling cylinder. The thermoplastic sheet material in the James system thus is subjected to intrinsically dissimilar rates and ranges of cooling on its respective opposite surfaces, consistent with the teaching in the patent at column 4, lines 38-41 that "it has been found desirable to extrude the curtain onto the cooled arcuate metallic surface of the drum 8 and then to the nip in actual practice to quickly cool the film." Accordingly, even if the system were modified to obtain the same heat transfer rates on both surfaces of the film in the nip between the cylinder and draw roll or belt, the thermoplastic material would already have been subjected to a preliminary cooling on one surface prior to concurrent cooling of both surfaces.

U.S. Pat. No. 2,590,186 to E. H. Land discloses a method of forming a solid film on the surface of a sheet-like material from a viscous liquid mass of the film-forming material. Sheet-like materials are fed along conveying paths with viscous liquid being fed to the sheets to provide a body of liquid therebetween. At least one of the sheets is absorbent of the solvent for the film-forming material, so that a substantial amount of drying of the formed film takes place rapidly due to such solvent absorption. When drying has reached a point where the film is a substantially continuous solid, at least one of the sheets is separated from the forming film and continued drying takes place due to evaporation of remaining solvent from the exposed surface of the film. The patent discloses in column 4, lines 55-67 to pass the supporting sheets having the film-forming material therebetween, through an oven at elevated temperature, or alternatively to expose them to dry hot air, infrared lamps, etc., to enhance the removal of solvent from the film-forming composition.

U.S. Pat. No. 3,852,387 to N. M. Bortnick, et al. discloses using paired endless belts for forming extruded polymer melts into thermoplastic sheets. A strand of extruded polymer melt is taken up between the moving belts at a temperature that allows the melt to adhere to the belts while being formed into a web by compression, spreading and flattening therebetween. The endless belts preferably utilize smooth, polished metallic surfaces to produce flat, optical quality thermoplastic sheet.

A plurality of compressed air knives are spaced intermediate the runs of the belts to enhance cooling of the thermoplastic material, if ambient cooling proves inadequate, to a temperature allowing parting of the product sheet without adherence to either belt.

SUMMARY OF THE INVENTION

In one aspect, the present invention relates to apparatus for forming a self-adhering elastomeric ribbon, comprising means for extruding a hot-melt self-adhering elastomeric material in ribbon form, and foraminous means for conveying the extrudate ribbon away from the extruding means, with the extrudate ribbon bisurfacially exposed for cooling thereof.

A further aspect relates to such foraminous means as bisurfacially supporting the extrudate ribbon while conveying same away from the extruding means.

In another aspect, the invention relates to apparatus of the above-described type, further comprising means for bisurfacially cooling the extrudate ribbon while it is being conveyed by the foraminous means.

In another aspect, the invention relates to apparatus of the aforementioned type, wherein the means for bisurfacially cooling the extrudate ribbon comprises means for directing a coolant fluid against both surfaces of the extrudate ribbon.

Another aspect of the present invention relates to a method for forming a self-adhering elastomeric ribbon comprising extruding a hot-melt self-adhering elastomeric material in ribbon form, and conveying the extrudate ribbon away from the extruding step, with the extrudate ribbon bisurfacially exposed for cooling thereof.

Still another aspect of the invention relates to a method of the above type, further including bisurfacially supporting the extrudate ribbon while conveying same away from the extruding step.

In yet another aspect, the invention relates to a method of the aforementioned type, further comprising bisurfacially cooling the extrudate ribbon while it is being conveyed away from the extruding step.

DETAILED DESCRIPTION OF THE PREFERRED EMBODIMENTS

Figure 1:
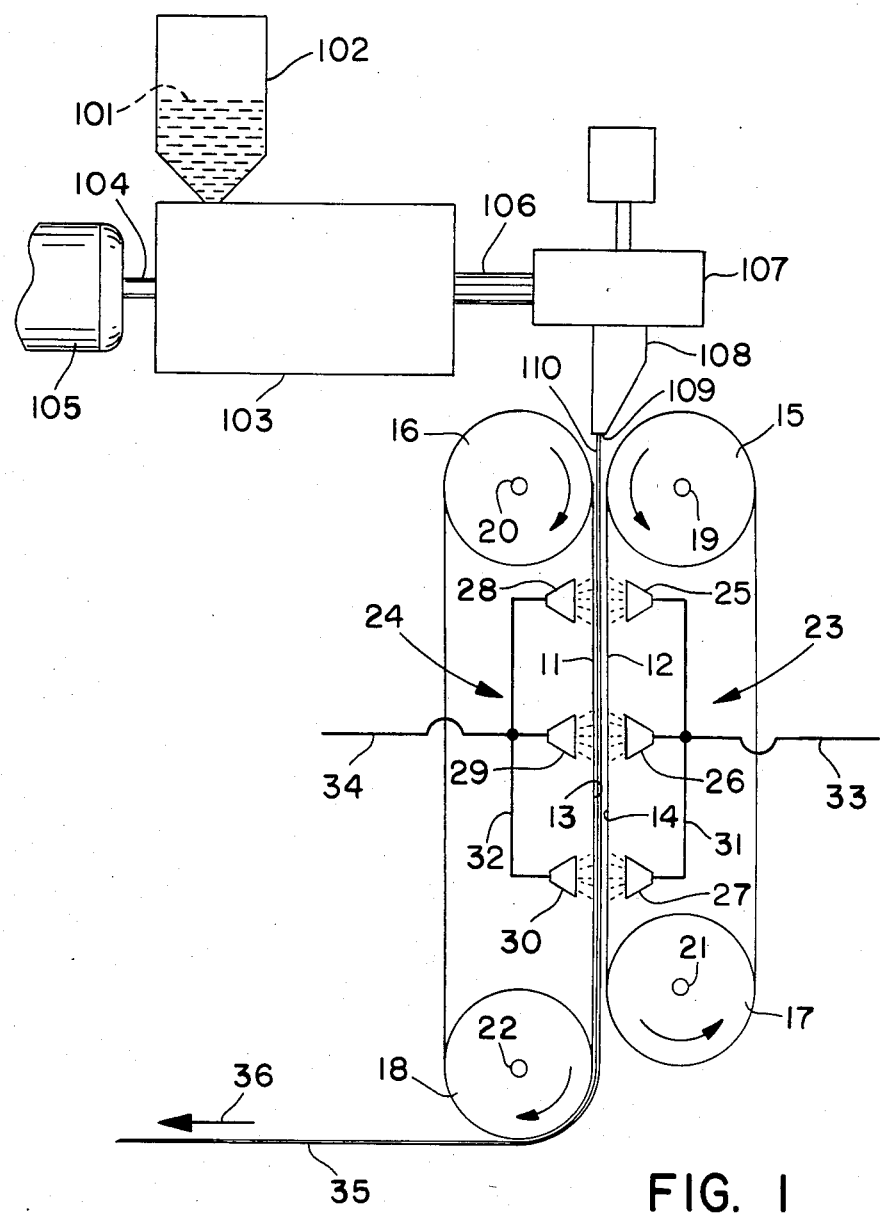
FIG. 1 is a schematic diagram of a process system for carrying out the present invention according to one embodiment thereof.

As indicated hereinabove, a specific problem associated with the prior art practice of cooling extruded self-adherent elastomeric materials on a chill roll is that the resulting extrudate article has nonuniform properties due to the uneven rate and extend of cooling. When ribbon-form extrudates are quenched, there is a two-sided effect on tack, tensile strength, stress relaxation, and dynamic adhesion. The two-sided tack effect is particularly detrimental to the desired uniform self-adhering character of the elastomeric ribbon. The chill roll cooling yields significantly less tack on the surface of the ribbon which contacts the chill roll than the side away from the chill roll.

The present invention provides for conveying the extrudate ribbon of hot-melt self-adhering elastomeric material away from the extruding means, the ribbon being bisurfacially exposed for cooling. Such cooling may be selected by simple exposure of the extrudate ribbon to the ambient conditions, if same are sufficient to effect such cooling of the ribbon. Alternatively, it may be useful in the broad practice of the present invention to utilize specific means for bisurfacially cooling the extrudate ribbon. It is advantageous in many instances to carry out the present invention by bisurfacially supporting and conveying the extrudate ribbon away from the extruding step.

As used herein, the term "bisurfacially" in reference to supporting, conveying, and/or cooling the extrudate ribbon means that the extrudate ribbon is supported, conveyed and/or cooled simultaneously on both main surfaces of the ribbon, i.e., the top and bottom surfaces of the ribbon, when the ribbon is disposed on a horizontal surface. By such bisurfacial cooling, optionally suitably carried out with bisurfacial supporting and conveying of the extrudate ribbon, the extrudate ribbon of self-adhering elastomeric material is effectively cooled to yield a product elastomeric ribbon which is isotropic, i.e., substantially uniform in its physical properties throughout its entire volume, as compared to a corresponding elastomeric ribbon which is monosurfacially cooled.

The elastomeric materials which may be useful in the broad practice of the present invention include hot-melt elastomeric materials such as natural or synthetic rubbers, blends of natural and synthetic rubbers, synthetic elastomeric resins, combinations of natural rubber and synthetic resins, as well as any other composition generally useful in the manufacture of elastomeric self-adherent ribbons by hot-melt extrusion. As indicated previously herein, the self-adhering elastomeric ribbon may be self-adhering per se, or may be an elastomeric material of any of the above-mentioned types to which is added, prior to or during extrusion, a tackifier of conventional type. A preferred class of materials include elastomeric hot-melt adhesive (self-adhering elastic) materials of the type disclosed and claimed in U.S. Pat. No. 4,418,123 to Bunnelle, et al., incorporated herein by reference. Particularly suitable materials are thermoplastic synthetic resin and rubber block copolymer compositions, as utilized in the FULLASTIC® extruded self-adhering elastic.

Referring to the schematically illustrated process system according to one embodiment of the invention as shown in FIG. 1, the hot-meltable self-adhering elastomeric material 101, in particulate form or in the form of a (heat) flowable resin, is fed from hopper 102 into extruder 103, which may be a screw-type extruder of conventional type wherein the extrusion screw is coupled by drive shaft 104 to drive motor 105. From the extruder 103, wherein the elastomeric material is processed as a hot melt under conditions of elevated temperature and pressure, the material passes via transfer conduit 106 into manifold 107 for introduction into the slotted die 108 featuring die orifice 109, from which the hot-melt elastomeric material is discharged in the form of an extrudate ribbon 110.

The extrudate ribbon 110 then passes to an assembly for bisurfacially supporting the extrudate ribbon and conveying same away from the extrusion apparatus comprising die 108, manifold 107 and extruder 103. More specifically, the extrudate ribbon 110 is engaged simultaneously between opposedly facing foraminous belts 11 and 12 on their opposed faces 13 and 14, respectively. The foraminous belts 11 and 12 are each mounted on rolls, foraminous belt 12 being mounted on rolls 15 and 17, in turn mounted on shafts 19 and 21, respectively. Foraminous belt 11, which is of endless form, is translated so that face 14 thereof is translated downwardly in the position shown. In like manner, foraminous belt 11 is mounted on rolls 16 and 18, in turn mounted on shafts 20 and 22, respectively, whereby the face 13 of belt 11 is downwardly translated in the position shown. The rolls associated with each foraminous belt include a drive roll, e.g., the rolls 15 and 16 mounted on shafts 19 and 20 may be coupled to suitable drive means (not shown) whereby the respective rolls are driven in counter-directional rotation to one another, in the direction of the arrows shown on such rolls in the drawing. In such manner, the opposed faces 13, 14 of the oppositely facing foraminous belts 11, 12, respectively, are unidirectionally translated for conveying of the extrudate ribbon 110 away from the extruding means.

The foraminous belts may be of any suitable material of construction, such as ferrous alloys or other metals, ceramics, composites, plastics, etc., with materials such as stainless steel being suitable.

The foraminous belts suitably may be coated on their outer surfaces (opposed faces) 13 and 14 with a release agent to oppose adhesion of the extrudate ribbon thereto or otherwise may be provided with a surface or surface coating which is adhesion-free in respect of the extrudate ribbon. Thus, for example, a non-stick coating surface may be provided on the foraminous belt, or the belt may be coated with a silicone material or other satisfactory release agent.

The term "foraminous belt" as used herein and in the claims is intended to be broadly construed to include any and all suitable foraminous means which may be usefully employed for conveying the extrudate ribbon away from the extruding means, with the extrudate ribbon bisurfacially exposed for cooling. Thus, the foraminous means may be constituted by a reticulated foraminous web, grid, mesh, wire carrier or other structural element which is foraminous in character to bisurfacially expose the extrudate ribbon for cooling. It is a critical feature of the present invention that the extrudate ribbon is bisurfacially exposed for cooling by the foraminous means, to allow direct heat exchange with the main surfaces of the extrudate ribbon while it is being supported and conveyed by the foraminous means. Accordingly, it is preferred in practice that the open area of the foraminous means be as high as possible consistent with its function of supporting and conveying the extrudate ribbon.

Depending on the material characteristics of the extrudate ribbon and the open area provided by the foraminous supporting and conveying means, it may be satisfactory in some instances to cool the extrudate ribbon at its bisurfacially exposed faces by simple exposure to ambient conditions. In most instances, however, it is generally more advantageous to utilize specifically provided cooling means for bisurfacially cooling the extrudate ribbon while it is being supported and conveyed by the aforementioned foraminous means, in order to insure close control and uniformity of the cooling step. Thus, the means for bisurfacially cooling the extrudate ribbon while it is being supported and conveyed by the aforementioned foraminous means may suitably comprise means for directing a coolant fluid, such as air, nitrogen or other fluid, at suitable temperature, against both surfaces of the extrudate ribbon. As used herein in respect to the cooling step, the term "bisurfacially cooling" means that the extrudate ribbon is cooled substantially equivalently at both main surfaces thereof, to a generally equivalent extend and at a generally equivalent heat transfer rate.

In FIG. 1, the means 23, 24 for bisurfacially cooling the extrudate ribbon 110 comprise a plurality of discharge nozzles 25, 26 and 27 associated with the foraminous belt 12 which are manifolded together by a conduit 31 joined by a coolant fluid supply line 33 to a source of coolant fluid (not shown), and with discharge nozzles 28, 29 and 30 in like manner being manifolded together by conduit 32 joined by coolant fluid supply line 34 to a suitable source of coolant fluid (not shown). The nozzles discharge coolant fluid against both surfaces of the extrudate ribbon, with the coolant flow streams discharged from the nozzles passing through the open areas in the foraminous belts to directly contact the respective main surfaces of the extrudate ribbon. In lieu of discharge nozzles, the cooling means may be constituted by air shrouds or vortex-producing means which direct a coolant fluid through the foraminous belts and against the main surfaces of the extrudate ribbon, or alternatively other suitable cooling means of conventional type as known in the art may be employed.

Further, it may be desirable in some instances of the present invention to provide for enhancement of the bisurfacial cooling of the extrudate ribbon by provision of internal cooling in the rolls on which the foraminous supporting and conveying means are disposed, e.g., the drive rolls 15 and 16, whereby the extrudate ribbon 110 as it enters the nip formed by rolls 15 and 16 and their associated foraminous belts 12 and 11, respectively, may be subjected to initial bisurfacially cooling at high rate, followed by reduced bisurfacially cooling downstream from such nip along the foraminous belts. Thus, it is within the purview of the present invention to provide for stepwise or continuous gradient cooling of the extrudate ribbon in bisurfacial fashion while it is being supported and conveyed by the foraminous means.

Subsequent to completion of the bisurfacial cooling of the extrudate ribbon, the product self-adhering elastomeric ribbon 35 is discharged from the process system in the direction shown by arrow 36, for downstream processing and/or end-use.

Figure 2:
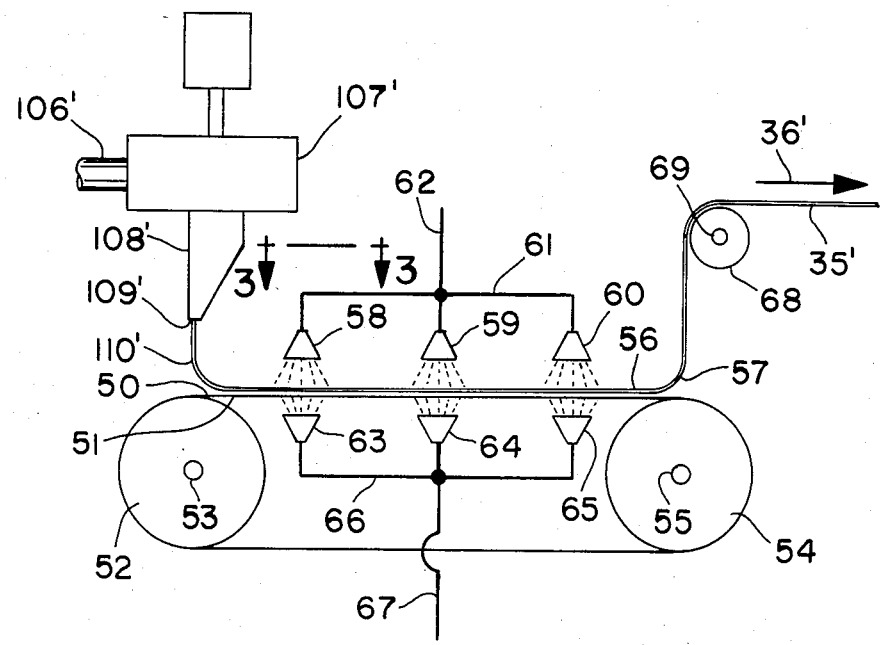
FIG. 2 is a schematic diagram of an alternative process system for carrying out the present invention according to another embodiment thereof.

FIG. 2 shows a schematic diagram of a process system for carrying out the present invention, according to another embodiment thereof. Corresponding system elements are numbered correspondingly with respect to FIG. 1, but with prime designations suffixed to the corresponding reference numerals. Thus, hot-meltable self-adhering elastic material flows through transfer conduit 106' into manifold 107' and then to die 108' containing orifice 109' for discharge in the form of an extrudate ribbon 110'. The extrudate ribbon then is received by the top surface 50 of the foraminous belt 51 for supporting and conveying the ribbon away from the extruding means. The foraminous belt 51 is of endless form, being mounted on rolls 52 and 54, mounted in turn on shafts 53 and 55, respectively. One of these shafts is suitably joined to a drive means, such as an electric motor (not shown) which rotates same in a clockwise direction to translate the ribbon through the cooling operation and away from the extruding means, as indicated. Thus, the top surface of ribbon 110' receives cooling fluid from the nozzles 58, 59 and 60 each of which is manifolded together by conduit 61 joined in turn to coolant source line 62, joined to a suitable source of coolant fluid (not shown). In like manner, coolant nozzles 63, 64 and 65 are manifolded together by conduit 66 which in turn is joined to coolant line 67 joined to a source of coolant fluid (not shown), whereby coolant streams are directed at the bottom surface of the ribbon reposing on the foraminous belt 51. In such manner, the extrudate ribbon is bisurfacially exposed on the foraminous belt for cooling of both sides thereof. The product extrudate ribbon 35', bisurfacially cooled on its top surface 56 and its bottom surface 57 then is withdrawn from the foraminous belt by means of take-off roll 68 mounted on shaft 69, by means of which the ribbon is discharged from the process in the direction shown by arrow 36' for further processing and/or end use.

Figure 3:
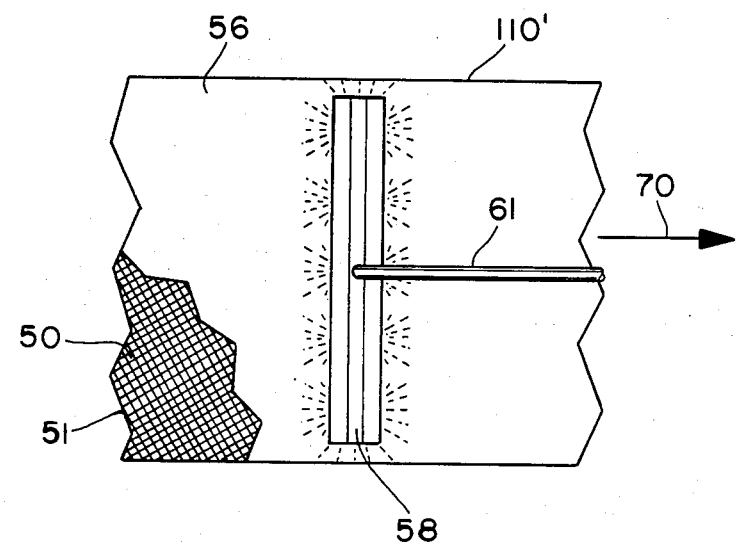
FIG. 3 is a plan view of the conveying means of FIG. 2, taken along line 3—3 thereof.

FIG. 3 is a plan view of a portion of the FIG. 2 system, taken along line 3—3 thereof, showing the extrudate ribbon 110' being disposed on the top surface 50 of foraminous belt 51. The manifold conduit 61 as shown supplies coolant fluid to the nozzle 58, the latter extending transversely across the extrudate ribbon top surface 56, so that gas discharged from the nozzle 58 cools such top surface as the ribbon is translated in the direction shown by arrow 70.

The embodiment shown in FIGS. 2 and 3, thus utilizes a single foraminous belt for conveying the extrudate ribbon away from the extruding means, with the extrudate ribbon bisurfacially exposed for cooling thereof. In systems of the type shown in FIGS. 2 and 3, wherein the extrudate ribbon is monosurfacially supported and conveyed with the extrudate ribbon bisurfacially exposed for cooling, it may be necessary to vary the coolant flow rate or other cooling parameters on either side of the ribbon to account or otherwise adjust for the heat transfer resistance imposed by the foraminous belt, i.e., it may be necessary to direct a higher flow rate of coolant fluid at the bottom surface to provide cooling thereof equivalent to cooling effected by coolant flow against the top surface, which is not supported by any foraminous belt. Such adjustments can readily be made without undue experimentation to realize bisurfacial cooling at the same rate of heat transfer and to the same extent of cooling on both sides of the extrudate ribbon.

The self-adhering elastomeric ribbon product of the present invention may usefully be employed in elastic gathering strips to impart conformability to body portion openings in garments, such as for example dispossable diapers or undergarments, wherein close conformability to the actual size of the wearer's body is desired.

The features and advantages of the present invention are shown by the following Example.

EXAMPLE

Four samples were made of self-adhering elastomeric ribbons to demonstrate the advantages of the present invention. All samples were made using as the hot-melt extruded elastomeric material, FULLASTIC® elastic, commercially available from H. B. Fuller Co. Samples 1–3 were extruded from a Brabender extruder using a 0.50 inch ×0.020 inch flat die at 190° C. Sample 4 was extruded from a killion extruder using a 9/16 inch ×0.024 inch die at 190° C.

Sample 1 was cooled on a chill roll whose outer cylindrical surface was coated with a silicone coating to resist adhesion of the extrudate ribbon thereto, the chill roll having a diameter of two feet and a rotational speed of 10 rpm. The chill roll was cooled by partial immersion of the lower extremity thereof in a water bath maintained at room temperature (20° C). This sample thus was monosurfacially cooled, with its top main surface having been translated through the cooling step in contact with the surface of the chill roll; the bottom main surface of the sample constituted the opposite surface of the ribbon, which did not contact the chill roll.

Sample 2 was analogously cooled in the manner of Sample 1, but without water bath immersion of the chill roll. Thus, the top main surface of the sample was contacted during cooling with the dry surface of the chill roll, while the bottom main surface constituted the opposite surface which did not contact the chill roll.

Sample 3 was bisurfacially cooled to simulate the present invention, without exposure to any water bath or chill roll cooling means. Instead, the respective top and bottom main surfaces of the extrudate ribbon were festooned onto separate sheets of release paper for cooling by exposure to ambient conditions. The release paper thus served as supporting and conveying means simulative of foraminous means, due to the extremely low heat transfer resistance of the release paper, i.e., simulative of exposure of the ribbon's main surfaces to ambient conditions.

Sample 4 was monofacially cooled by exposure to a chill roll maintained at a temperature of 46° F. The top main surface of the sample was cooled against the chill roll surface, while the bottom main surface of the sample was not in contact with the chill roll.

The various test samples described above were subjected to determinations of their tensile strength, stress relaxation, dynamic adhesion and initial tack. The test procedures for these determinations were as follows.

TENSILE STRENGTH

Each sample was tested to determine the tensile strength in psi at 100% elongation under standard conditions. Each sample was conditioned for a minimum of 24 hours at standard conditions 73.5±2° F., 50%±2% RH before testing. All testing was done at standard-condition atmosphere. The materials were cut into test ribbons approximately 4.0" long. Each ribbon was marked with two lines, 3.0" apart. The ribbon cross-sectional area was determined. The Instron testing device was calibrated and zeroed and set as below:
Gage length: 3",
Crosshead speed: 4"/min. (200 mm/min.),
Test direction: up (down on older models),
Flex correction: none,
Optional chart speed: 2"/min. (50 mm/min.),
Elongation (extension length): 3" (100%).
The ribbon was placed into upper jaw with the marked line coincident with edge of clamping jaw edge. The bottom end of ribbon was placed into lower jaw and with the bottom line coincident with clamp edge. The cross head movement in test direction was actuated. Record this value and omit steps 13 and 14 and the instantaneous tension pounds-force at 100% elongation (6" jaw separation). The stress was recorded. Compute in psi at 100% elongation by dividing tension at 100% elongation (pounds) by specimen cross-sectional area (sq. in.).

CREEP RESISTANCE

The creep resistance of the material was evaluated by determining the ability of a 0.5"×0.020" by 4.00" ribbon to recover to its initial length after prolonged stretching at an elevated temperature. The material was cut into test ribbons approximately 5.0" long. The ribbons were marked with two lines 4.0" apart. A creep testing device (the Model Shop) was set so that the distance from edge of clamp to edge of opposing clamp was 8.0"±0.01" the full open position distance. The tester was closed to allow a 3" gap between opposing clamp edges. The marked ribbons were clamped into test device, putting the marked lines exactly at the edge of the clamping surfaces. The ribbons were extended and locked in the extended (8" testing) position. The creep-testing device was placed into the preheated oven at 100° F. in a horizontal position. Five (5) minutes was allowed for oven to equilibrate to test temperature (100° F.) and held at that condition for four (4) hours. The creep-testing device was removed and placed on a horizontal surface. The ribbons were released to eliminate stress and transferred one at a time to a flat, nonstick surface and equilibrated for 15 minutes at standard conditions. After equilibration each ribbon was measured with a caliper while lying flat. The creep of each material was determined as follows:

$$\% \text{ Creep} = \frac{\text{Final length} - \text{Initial length}}{\text{Initial length}} \times 100$$

STRESS RELAXATION

Each sample was tested to determine the rate of loss of elastic retraction force at 120° F. and 30% elongation. The material was cut to approximately 3.0" lengths. Each ribbon was marked with two lines 2.0" apart. The test ribbon was clamped into nonslip holding clamps and equilibrated for fifteen (15) minutes at 120° F. The ribbon was then extended to 2.6" (30% elongation), placed in an oven and readings were of elapsed time vs. force for two hours. A slope of $\log_{10}$ of time (abscissa) versus the $\log_{10}$ of force (ordinate) was determined and the antilog of the slope computed. The percent drop in force per dacade change in time is expressed as below:

% drop in force per decade of time = [1.00 − antilog (slope of log-log plot)×100.

STATIC ADHESION

Each sample was tested to determine the adhesion between material and poly under static conditions. A 0.5"×0.020" by 2 1/2" ribbon was sealed to 1 mm poly for 2 seconds at 20 psi; then a 180° peel was done using a 200 gram dead weight at 120° C. The time of adhesion failure was recorded in minutes.

DYNAMIC ADHESION

Each sample was also tested to determine the dynamic adhesion value between material and poly. A 0.5"×0.020" ribbon was sealed to 1 mm poly under 20 psi for 2 seconds and then a 180° peel was done by dynamically pulling the material from the poly and the force required to do this was recorded.

The test results of the aforementioned physical property determinations are set forth in Table 1 below:

TABLE I

| TEST | SAMPLE | | | |
|---|---|---|---|---|
| | 1 | 2 | 3 | 4 |
| Tensile strength, psi | 77 | 76 | 84 | 64 |
| Stress relaxation, % | 12.0 | 12.2 | 11.2 | 15.6 |
| Dynamic adhesion, avg. gm. | 1195 | 1226 | 1309 | 728 |
| Initial tack, avg. gm. | 235 | 234 | 232 | 234 |
| Dynamic adhesion, top[1], gm. | 1117 | 1183 | 1363 | 822 |
| Dynamic adhesion, bottom[2], gm. | 1272 | 1268 | 1255 | 634 |

TABLE I-continued

| TEST | SAMPLE | | | |
|---|---|---|---|---|
| | 1 | 2 | 3 | 4 |
| Dynamic adhesion, difference, gm. | 155 | 108 | 85 | 188 |
| Initial tack, top[1], gm. | 232 | 243 | 235 | 228 |
| Initial tack, bottom[2], gm. | 238 | 224 | 228 | 239 |
| Initial tack, difference, gm. | 6 | 19 | 7 | 4 |

[1] top main surface of the extrudate ribbon.
[2] bottom main surface of the extrudate ribbon.

The results shown in Table I demonstrate that Sample 3, prepared by a process simulative of the present invention, produced a ribbon product which had higher tensile strength, lower stress relaxation, higher dynamic adhesion and substantially equal initial tack, as compared to Samples 1, 2 and 4, representative of the prior art production of self-adhering elastomeric extrudates. Further, as regards the two-sided effects of the cooling process, it is seen that the differential for Sample 3 between dynamic adhesion values measured at the main top and bottom surfaces was significantly lower than corresponding values for Samples 1, 2 and 4, which were monosurfacially cooled.

As regards initial tack values measured at the main top and bottom surfaces of the respective ribbon samples, the differential measured for Sample 3 was substantially less than that of Sample 2, which utilized monosurfacial exposure of the ribbon to a chill roll. Such differential for Sample 3 also was generally consistent with the values measured for Samples 1 and 4, Sample 4 using a low temperature chill roll and Sample 1 utilizing a chill roll disposed in a water bath.

Although preferred embodiments of the present invention have been described in detail, it will be appreciated that other modifications and variations thereof, along with other embodiments, are possible and accordingly, all such apparent modifications, variations and embodiments are to be regarded as being within the spirit and the scope of the present invention.

What is claimed is:

1. Apparatus for providing uniform gradient cooling simultaneously on all sides of an extrudable material to maintain the physical properties uniformly throughout the material, comprising:
   means for extruding the material,
   foraminous means for conveying the extruded material,
   bisurfacially cooling means for directing a cooling medium simultaneously against the sides of the extruded material, and
   temperature-gradient control means operatively connected to said bisurfacial cooling means for selectively varying the temperature of the cooling medium to provide continuous gradient cooling on all sides of the material to maintain its physical properties uniformly throughout.

2. The apparatus of claim 1 wherein said foraminous means comprises a moveable first net-like support member having a plurality of openings therethrough, said openings being sufficiently large to permit the directed cooling medium to pass through said first net-like member and against the sides of the material to allow direct transfer of heat energy from the material to the cooling medium.

3. The apparatus of claim 2 wherein said bisurfacially cooling means is disposed about said first net-like support member and the material supported thereon to cool the sides of the material.

4. The apparatus of claim 3 wherein said temperature-gradient control means selectively varies the temperature of the cooling medium in the direction of conveyance of the material to provide controlled gradient cooling thereto.

5. The apparatus of claim 4 wherein said foraminous means further comprises a moveable second net-like support member having a plurality of openings therethrough, said first and said second net-like support members being generally vertically disposed and in mutually facing relationship for receiving the extruded material therebetween.

6. The apparatus of claim 5 wherein said first and said second net-like support members are moveably supported by rotatable first and rotatable second roll members, respectively, and wherein said bisurfacial cooling means is disposed about both said first and said second net-like support members and the material therebetween.

7. The apparatus of claim 6 wherein said roll members are internally cooled to transfer heat energy from the material and through said first and said second net-like support members.

8. The apparatus of claim 7 wherein said temperature-gradient control means selectively varies the internal cooling of said roll members, thereby providing additional gradient cooling to the material.

9. The apparatus of claim 8 wherein said bisurfacial cooling means comprises a plurality of nozzles disposed about said first and said second net-like support members and oriented to direct the cooling medium against the sides of the material, and wherein said temperature-gradient control means further selectively varies the temperature of the cooling medium delivered to respective ones of said nozzles.

10. A method for providing uniform gradient cooling simultaneously on all sides of an extrudable material to maintain the physical properties uniformly through the material, comprising the steps of:
    extruding the material,
    providing a foraminous support member,
    conveying the extruded material on the foraminous support member,
    bisurfacially cooling the material by directing a cooling medium simultaneously against the sides of the extruded material, and
    uniformly varying the temperature of the cooling medium to provide continuous gradient cooling on all sides of the material to maintain its physical properties uniformly thereout.

11. The method of claim 10 wherein the foraminous support member has a plurality of openings therein, the openings being sufficiently large to permit the directed cooling medium to pass therethrough and against the sides of the material.

12. The method of claim 11 wherein the temperature of the cooling medium is uniformly varied in the direction of conveyance.

* * * * *